United States Patent [19]

Hapke

[11] 4,449,678

[45] May 22, 1984

[54] PRESSURE BALANCE NONAXISYMMETRIC HIGH ASPECT RATIO AFTERBURNER CONVERGENT NOZZLE

[75] Inventor: Donald W. Hapke, Issaquah, Wash.

[73] Assignee: The Boeing Company, Seattle, Wash.

[21] Appl. No.: 306,744

[22] Filed: Sep. 29, 1981

[51] Int. Cl.³ .......................... F02K 1/06; B64D 27/18
[52] U.S. Cl. ................................ 244/12.5; 244/23 D;
244/55; 60/232; 60/242; 60/271; 239/265.19; 239/265.33
[58] Field of Search ...................... 244/12.5, 23 D, 66, 244/12.4, 90 B; 239/265.19, 265.33, 265.35, 265.13, 265.43, 265.37; 60/228, 271, 230, 242, 232, 233, 261

[56] References Cited

U.S. PATENT DOCUMENTS

| | | | |
|---|---|---|---|
| 2,427,980 | 9/1947 | Stinson et al. | 244/90 B |
| 3,773,280 | 11/1973 | Buchstaller | 239/265.35 X |
| 3,897,907 | 8/1975 | Colley | 239/265.39 |
| 4,000,611 | 1/1977 | McCardle, Jr. et al. | 244/12.5 X |
| 4,000,854 | 1/1977 | Konarski et al. | 60/230 |
| 4,280,660 | 7/1981 | Wooten, Jr. et al. | 239/265.35 |

Primary Examiner—Trygve M. Blix
Assistant Examiner—Rodney Corl
Attorney, Agent, or Firm—Hughes, Barnard & Cassidy

[57] ABSTRACT

An improved pressure balanced nonaxisymmetric high aspect ratio afterburner convergent nozzle of the type adapted to be mounted on a jet engine suspended from an airfoil's wing spar structure, and characterized by its simplicity of construction, ease and reliability of operation, and improved simplified sealing characteristics; yet, which permits substantial reduction of the included angle between the wing chord reference plane WCRP and the visual line-of-sight from the airfoil trailing edge into the jet engine nozzle while in its cruise position. More specifically, the present invention pertains to a simplified pressure balanced nonaxisymmetric high aspect ratio afterburner convergent nozzle construction which permits of simplified, highly effective sealing arrangements and wherein when the nozzle is shifted to a dry nozzle position—i.e., the cruise position—the trailing edge line-of-sight into the nozzle is maintained at a minimum angle, preferably on the order of from about 5° to about 10° as measured from the wing chord reference plane WCRP.

22 Claims, 6 Drawing Figures

PRESSURE BALANCE NONAXISYMMETRIC HIGH ASPECT RATIO AFTERBURNER CONVERGENT NOZZLE

RELATED APPLICATION

Donald W. Hapke, Ser. No. 306,746, filed Sept. 29, 1981, for "Jet Engine Two Dimensional, Asymmetric Afterburner Nozzle."

BACKGROUND OF THE INVENTION

The present invention relates generally to improved nonaxisymmetric high aspect ratio afterburner convergent nozzles for use with aircraft jet propulsion engines; and, more particularly, to a nonaxisymmetric high aspect ratio afterburner convergent nozzle of the type employing a static pressure balance chamber and which finds particularly advantageous use in military-type aircraft requiring low observable infrared and cross-sectional radar detection. In its principal aspects, the invention is concerned with a jet propulsion engine afterburner nozzle which can be mounted on an engine suspended from the airfoil's wing spar structure and where the nozzle can be readily shifted between a convergent dry (*cruise*) attitude and a wet (*afterburn*) attitude; yet, wherein the trailing edge line-of-sight is maintained at a minimum included angle $\theta$—preferably on the order of from about 5° to about 10°—with respect to the wing chord reference plane when the nozzle is in its dry or *cruise* position.

In the design of military jet aircraft, one of the prime considerations is to locate the jet engine relative to the supporting airfoil structure in such a manner that enemy aircraft systems are precluded from looking into the engine's relatively large nozzle opening and detecting hot engine parts. It has, of course, long been recognized that one "solution" to this problem is to mount the jet engine tightly beneath the airfoil so as to provide a low profile and a minimal trailing edge line-of-sight into the nozzle. Unfortunately, however, such jet engine nozzles must be controlled so as to vary the nozzle opening between *cruise* and *afterburn* positions—i.e., between dry and wet nozzle positions. Consequently, prior art approaches to this problem have generally required relatively complex structures including static pressure load balance chambers disposed above the exhaust nozzle and within the critical internal wing spar structural envelope. The additional structural components, seals, maintenance and envelope space required have, in turn, increased the weight of the engine nozzle and the loading of the rear engine support frame. A typical example of such a device is that disclosed in McCardle, Jr. et al U.S. Pat. No. 4,000,611. However, despite such efforts at the expense of critical wing spar structural space, the trailing edge line-of-sight has remained at unacceptably high angles (on the order of from about 35° to on the order of 40°) with respect to the wing chord reference plane.

Another common prior art approach has been the use of augmented deflector-type exhaust nozzles which may have additional application for short take-off and landing (STOL) and vertical take-off and landing (VTOL) type aircraft such, for example, as those disclosed in: Nash U.S. Pat. No. 3,979,067; Nash et al U.S. Pat. Nos. 4,000,610 and 4,073,441; and, Wakeman et al U.S. Pat. No. 4,000,612. However, the complex linkages and deflector-type vanes employed have not led to minimizing the trailing edge line-of-sight.

Other prior art patents which are of general interest for their disclosures of tiltable nozzles or the like employing a central trunnion-type mounting include: Jewell U.S. Pat. No. 3,003,312; Gaubatz U.S. Pat. No. 3,032,982; Fisher U.S. Pat. No. 3,210,936; Zirin U.S. Pat. No. 3,319,892; and, Connolly U.S. Pat. No. 3,362,646. Such patents do not, however, relate to the problem of minimizing the trailing edge line-of-sight into the nozzle openings, nor do they pertain specifically to nonaxisymmetric high aspect ratio afterburner convergent nozzles of the type employing static pressure balance chambers.

SUMMARY OF THE INVENTION

Accordingly, it is a general aim of the present invention to provide an improved low profile nozzle which overcomes the foregoing disadvantages inherent in conventional variable area nozzle constructions, and which permits the jet engine to be tucked tightly beneath the airfoil of a tactical-type aircraft; yet, wherein the nozzle throat area can be easily varied between convergent *cruise* (dry) and *afterburn* (wet) nozzle positions while maintaining an included angle $\theta$ between the wing chord reference plane WCRP and the trailing edge line-of-sight of only on the order of from about 5° to about 10° when the nozzle is in the *cruise* position even though the nozzle construction employs a static pressure balance chamber disposed within the wing spar structural envelope.

In another of its important aspects, it is an object of the invention to provide an improved convergent afterburner nozzle particularly suitable for tactical-type aircraft and the like, characterized by its simplicity of construction, and which employs simple, highly effective, and reliable sealing mechanisms; yet, which permits of significant reduction of the included angle between the wing chord reference plane and the trailing edge line-of-sight into the nozzle opening at *cruise* conditions even though the nozzle construction employs a static pressure load balance chamber disposed within the critical wing spar structural space above the nozzle.

Briefly stated, the foregoing objectives are attained by providing a variable area nozzle casing having: (i) an internal stationary cantilever-type upper nozzle duct member tucked tightly beneath the wing spar structure with such duct member defining a fixed upper nozzle wall; (ii) a rotatable lower nozzle duct defined by a transverse floor, a pair of upstanding spaced nozzle sidewalls located outboard of the cantilever-type nozzle duct member, and an upper transverse wall or cover, with the rotatable lower nozzle duct surrounding the stationary cantilever-type upper nozzle duct member and mounted with freedom for relative movement with respect thereto as the rotatable lower nozzle duct is rotated between *cruise* and *afterburn* positions; (iii) a stationary, at least partially spherical, support and sealing surface mounted on the rear extremity of the afterburner or augmentor casing; (iv) trunnion-type mounting means for supporting the rotatable lower nozzle duct for rotational movement about a horizontal transverse axis with an effective wiping-type generally spherical seal maintained at all operative positions of the rotatable lower nozzle duct between the forward end of the duct and the support and sealing surface on the rear of the afterburner or augmentor casing; (v) a foldable transverse pressure bulkhead interconnecting the rear end of the stationary cantilever-type upper nozzle duct member and the rear end of the upper transverse wall or cover of the rotatable duct for maintaining an enclosed static pressure balance chamber within the internal wing spar structural envelope at all operative nozzle positions; and (vi), generally horizontally oriented compression-type actuator means for supplying the forces necessary to rotate the rotatable lower nozzle duct about the trunnion mounting means so as to shift the nozzle between a convergent *cruise* position defining an included angle $\theta$ on the order of about 5° to about 10° between the trailing edge line-of-sight and the wing chord reference plane, and an *afterburn* position.

DESCRIPTION OF THE DRAWINGS

These and other objects and advantages of the present invention will become more readily apparent upon reading the following detailed description and upon reference to the attached drawings, in which.

Figure 1:
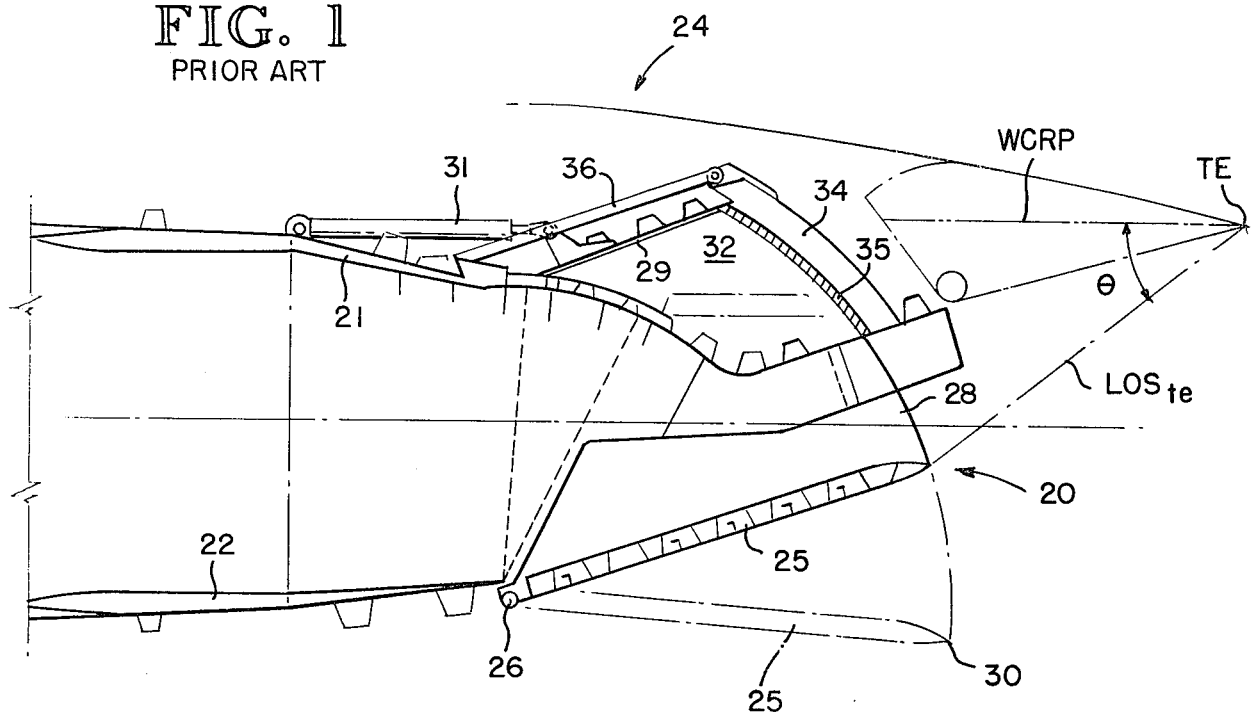
FIG. 1 is a fragmentary, somewhat diagrammatic vertical sectional view illustrating a conventional prior art variable area asymmetric load balance exhaust nozzle as mounted in an airfoil, illustrated in phantom, and depicting particularly the critical volume of wing spar structural space occupied by the nozzle when in the *cruise* position, as well as the unacceptably high trailing edge line-of-sight angle—an angle $\theta$ which is commonly on the order of between 35° and 40°.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Referring first to FIG. 1, there has been diagrammatically illustrated a conventional asymmetric load balancing exhaust nozzle system, generally indicated at 20, which is well known to those skilled in the art and which may, for example, be of the general type illustrated in the aforementioned McCardle, Jr. et al U.S. Pat. No. 4,000,611. Briefly, the conventional exhaust nozzle system 20 shown in FIG. 1 includes a nozzle casing 21 mounted coaxial with, and aft of, a conventional jet engine afterburner or augmentor casing 22; with the jet engine being mounted on, and suspended beneath, the wing spar structure (not shown) of an airfoil, generally indicated in phantom at 24, having a trailing edge TE. As here shown, the variable area nozzle assembly 20 includes a flap assembly 25 hingedly connected at 26 to the lower portion of the nozzle casing 21, with the flap assembly having a pair of upwardly extending nozzle sidewalls (one of which is shown at 28 in FIG. 1) and an upper cover 29. In this illustrative device, the flap assembly 25, nozzle sidewalls 28, and upper cover 29 are adapted to be pivoted about the hinged connection 26 between a *cruise*, or dry, position depicted in solid lines and an *afterburn*, or wet, position indicated in phantom at 30 by means of an actuator 31 which may take any conventional form well known to those skilled in the art and which will not be further described in detail herein. Mounted within the rear portion of the wing spar structural space is a pressure chamber 32 having a pressure chamber back-up plate 34 defining a sealing surface 35. Such back-up plate 34 is conventionally maintained in place by means of one or more tension links 36 secured at one end to the back-up plate 34 and at the opposite end to the nozzle casing 21. Suitable seals (not shown in detail) are provided for maintaining a totally enclosed, sealed, pressurized chamber 32 for balancing static load pressures as the nozzle throat area is varied.

The arrangement is such that when the variable area nozzle actuator 31 is actuated to pivot the flap assembly 25, sidewalls 28, and cover 29 from the *afterburn* position depicted in phantom at 30 to the solid line *cruise* position depicted in the drawing, the flap assembly sidewalls 28 and cover 29 move upwardly into the wing spar structural space. The pneumatic load balancing pressure chamber 32 serves to balance static pressure loads as the nozzle area is reduced. Of course, those skilled in the art will appreciate that a static pressure load balancing system of the type here depicted not only requires dedication of a significant portion of the critical wing spar structural space to provide for movement of the nozzle sidewalls 28 and cover 29 and to accommodate the static pressure balancing chamber 32 but; moreover, expensive complex sealing arrangements (not shown in detail) are required at the hinge connection 26, between the sidewalls 28 and the sealing surface 35 defined by the pressure chamber back-up plate 34, between the sidewalls 28 and the stationary nozzle casing 21, and between the cover 29 and the stationary nozzle casing 21. In conventional installations, the trailing edge line-of-sight $LOS_{te}$ when the nozzle assembly 20 is in the the solid line *cruise* position depicted, generally defines an included angle $\theta$ with respect to the wing chord reference plane WCRP which, in the exemplary case here illustrated, may range from on the order of 35° to on the order of 40°. Moreover, the complex seals required are generally such that extremely poor results are attained in terms of seal life and/or effectiveness.

Figure 2:
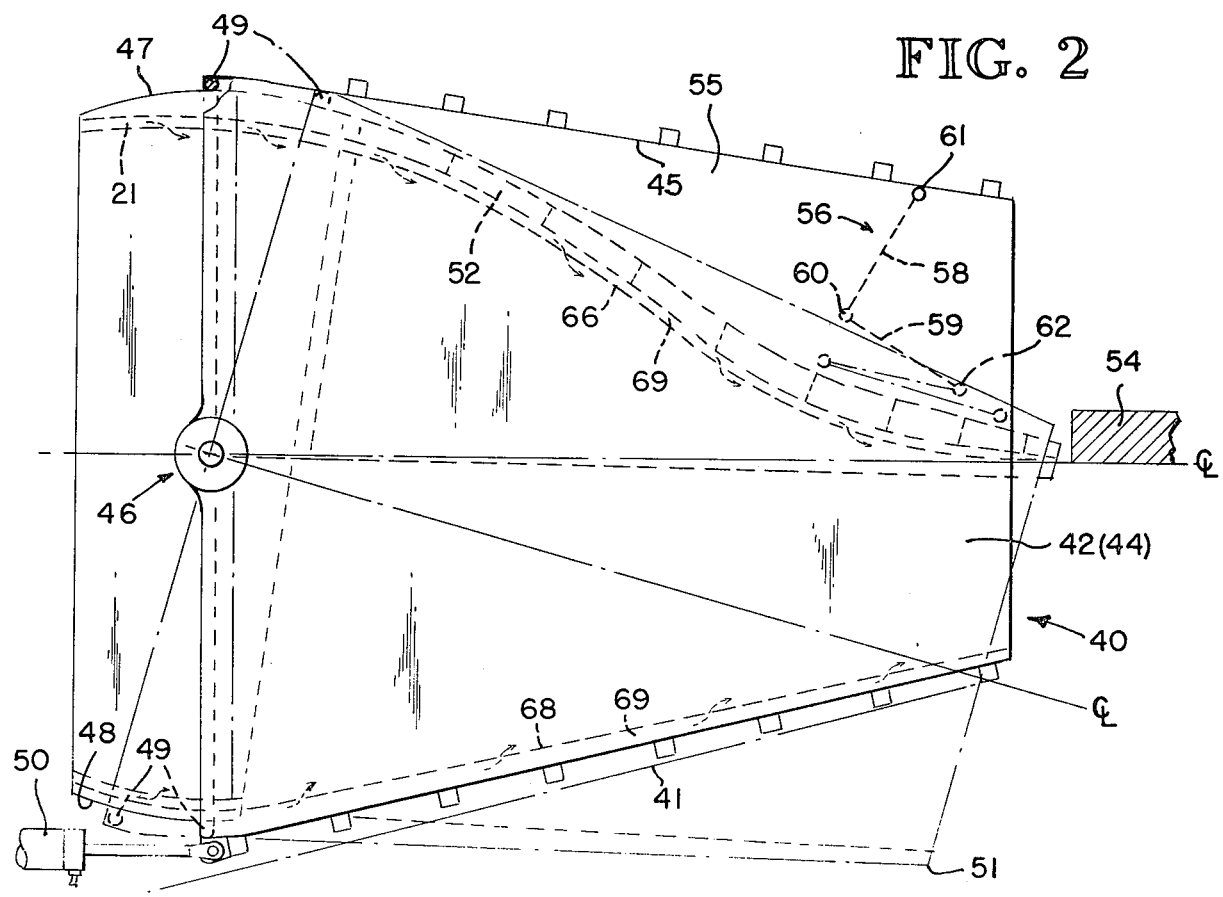
FIG. 2 is a fragmentary diagrammatic vertical sectional view similar to FIG. 1, but here illustrating a modified type of variable area asymmetric load balance exhaust nozzle embodying the features of the present invention.
Figure 5:
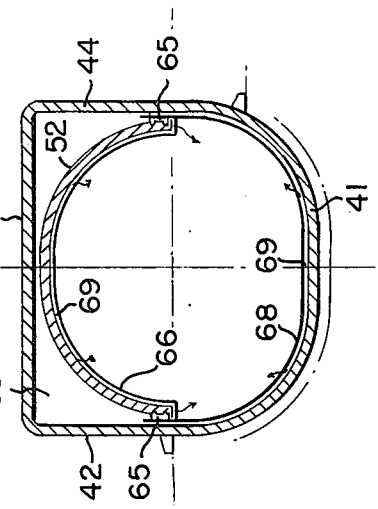
FIG. 5 is a transverse sectional view taken substantially along the line 5—5 in FIG. 4, here illustrating particularly the relationship between the internal stationary cantilever-type upper nozzle duct member and the rotatable nozzle duct; and, FIG. 6 is a transverse sectional view taken substantially along the line 6—6 in FIG. 4, here illustrating in solid lines the relative position of the nozzle components when the nozzle components are in the convergent or dry *cruise* position, and illustrating in phantom the relative position of the nozzle components when the nozzle components are in the wet *afterburn* position.

In accordance with the present invention, an improved nonaxisymmetric load balancing exhaust nozzle has been provided which permits of highly simplified construction and usage of simple, effective sealing means even in a variable area nozzle containing a static pressure load balance chamber; yet, wherein the included angle $\theta$ between the trailing edge line-of-sight $LOS_{te}$ and the wing chord reference plane WCRP can be substantially reduced to an included angle $\theta$ on the order of only about 5° to 10°. Thus, and as shown in FIG. 2, there has been illustrated a modified form of nonaxisymmetric load balancing exhaust nozzle employing the features of the present invention and generally indicated in diagrammatic form at 40. As best illustrated by reference to FIGS. 2, 5 and 6 conjointly, it will be noted that the exemplary nozzle 40 includes a lower transverse flap assembly or floor 41, a pair of spaced upstanding nozzle sidewalls 42, 44, and a transverse upper cover 45, with such components defining a totally enclosed (except for the nozzle inlet and outlet) convergent nonaxisymmetric nozzle assembly 40.

In carrying out the present invention, the foregoing convergent nonaxisymmetric nozzle assembly 40 is mounted on the rear end of the stationary nozzle casing 21 by means of a centrally located, transversely extending, trunnion-type mounting means generally indicated at 46, and with freedom for rotational movement about the trunnion mount. To facilitate maintenance of an effective seal at the forward end of the nozzle assembly 40, the rearward portion of the stationary nozzle casing 21 is preferably formed with upwardly and downwardly facing, at least partially spherical, spaced sealing surfaces 47 and 48, respectively, with such sealing surfaces 47 and 48 being interconnected by the generally upstanding casing sidewalls defined by the stationary nozzle casing 21. The forward end of rotatable nozzle 40 is shaped complementary to, and dimensioned to fit snugly about, the duct defined by sealing surfaces 47, 48 and the casing sidewalls of the stationary nozzle casing 21.

In keeping with the simplified sealing aspects of the present invention, a suitable seal 49 is mounted within the inner periphery of the rotatable nozzle assembly 40 for wiping sealing engagement with the spherical surfaces 47, 48 and the sidewalls of casing 21 as the nozzle assembly 40 is rotated about the trunnion mounting means 46 between *cruise* and *afterburn* positions. Such rotational movement may be accomplished by any suitable actuating means; but, preferably, the actuator comprises generally horizontally oriented, linear, compression-type fluid actuating means 50 mounted on the afterburner or augmentor casing 22 and coupled to the lower forward edge of the lower flap assembly or nozzle floor 41. Thus, contraction of the linear actuator 50 causes the nozzle assembly 40 to rotate in a clockwise direction as viewed in FIGS. 2 and 4 about the trunnion mounting means 46 from the solid line *cruise* position shown in the drawings to the *afterburn* position indicated in phantom at 51. Conversely, expansion of the linear actuator means 50 causes the nozzle assembly 40 to rotate in a counter-clockwise direction as viewed in the drawings about the trunnion mounting means 46 from the *afterburn* position indicated in phantom at 51 to the solid line *cruise* position shown.

In keeping with the invention, the nozzle casing 21 is provided with a rearwardly extending, integral, stationary cantilever-type internal duct member 52 defining a smooth continuation of the upwardly facing sealing surface 47 and which projects into, extends through, and is surrounded by, the convergent rotatable nozzle assembly 40; with the stationery cantilever-type internal duct member 52 terminating at its rearward end adjacent a heat shield 54 mounted on the lower surface of the airfoil 24 and extending rearwardly from the nozzle exit to the trailing edge TE of the airfoil. As best illustrated in FIG. 2, the transverse upper cover 45 and the depending sidewalls 42, 44 of the rotatable nozzle assembly 40, together with the cantilever-type internal nozzle duct member 52, define an intermediate internal pressure balance chamber 55. For the purpose of enclosing the chamber 55 while, at the same time, permitting the rotatable nozzle assembly 40 to move relative to the cantilever-type internal duct member 52, a folding transverse pressure bulkhead (generally indicated at 56 in FIG. 2) is provided adjacent the rear end of the nozzle assembly 40. The folding bulkhead 56 preferably includes first and second transversely extending panels 58, 59 which are interconnected by a transversely extending flexible diaphragm hinge seal 60 of conventional construction. The upper edge of panel 58 is secured to the upper nozzle cover 45 by means of a second transversely extending flexible diaphragm hinge seal 61, while the lower edge of panel 59 is coupled to the rearward end of the cantilever-type internal duct member 52 by means of a third similar transversely extending flexible diaphragm hinge seal 62.

Figure 6:
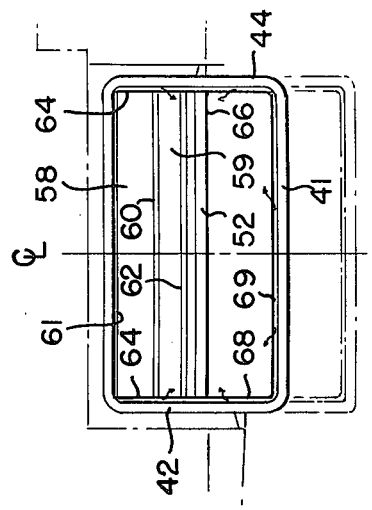
Figure 3:
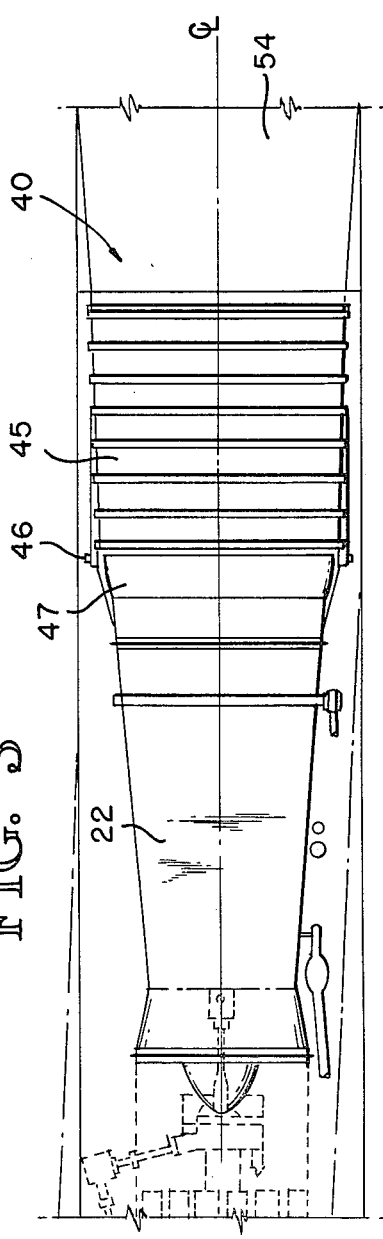
FIG. 3 is a fragmentary plan view of the asymmetric load balance exhaust nozzle depicted in FIG. 2 and embodying the features of the present invention.

As best illustrated in FIG. 6, the panels 58, 59 are dimensioned such as to completely span the space between the upstanding sidewalls 42, 44 of the rotatable nozzle assembly 40, and, suitable side sealing means (diagrammatically indicated at 64 in FIG. 6) are provided for forming a continuous wiping seal between the opposite edges of the panels 58, 59 and the respective sidewalls 42, 44 at all operative positions of the rotatable nozzle assembly 40. To complete and totally seal the enclosed pressure balance chamber 55, suitable conventional labyrinth-type seals 65 (FIG. 5) are provided along the lower outboard longitudinally extending edges of the cantilever-type internal duct member 52 so as to provide a wiping seal between the nozzle sidewalls 42, 44 and the internal stationary cantilever-type duct member 52 during relative movement between the duct 52 and the nozzle assembly 40.

Those skilled in the art will appreciate that, as a consequence of the foregoing construction, the enclosed static pressure balance chamber 55 (FIG. 2) is defined by the upper surface of the stationary cantilever-type duct member 52, the inner surfaces of the cover 45 and sidewalls 42, 44 of the rotatable nozzle 40, and the inner surfaces of the panels 58, 59 defining the foldable pressure bulkhead 56. All of the seals, *except* for hinge seals 60, 61 and 62, including: (i) the seal 49 between rotating nozzle 40 and the stationary casing 21; (ii) the seals 64 between the opposed lateral edges of the foldable pressure bulkhead 56 and nozzle sidewalls 42, 44; and (iii), the seals 65 between the longitudinal edges of the cantilever-type duct member 52 and nozzle sidewalls 42, 44; are of the non-deflecting, wiping variety and are characterized by their simplicity of construction, installation and maintenance, as well as by their effectiveness and durability in use. The three hinge seals 60, 61 and 62 are of conventional flexible diaphragm construction and have also proven to be highly effective and durable.

In the practice of the present invention, suitable heat shield liners 66, 68 (best shown in FIGS. 2 and 5) are provided on the interior of the cantilever-type internal duct member 52 and the rotatable nozzle assembly 40, respectively. Such heat shield liners 66, 68, and the various conventional pressure seals employed in the practice of the invention, are preferably exposed to continuous engine fan bleed air at maximum temperatures of 250° F. which is used within the nozzle duct to film cool the heat shield liners 66, 68 (FIGS. 2, 5 and 6) during afterburner operation and to provide air pressure balance for the pressure balance chamber 55. See, for example, FIGS. 2, 5 and 6 where it will be noted that such film of cooling engine fan bleed air is directed through the passages 69 defined by: (i) the heat shield 66 and the cantilever-type internal duct member 52; and (ii), the heat shield 68 and the members 41, 42 and 44 of the nozzle assembly 40; as indicated by the arrows.

Figure 4:
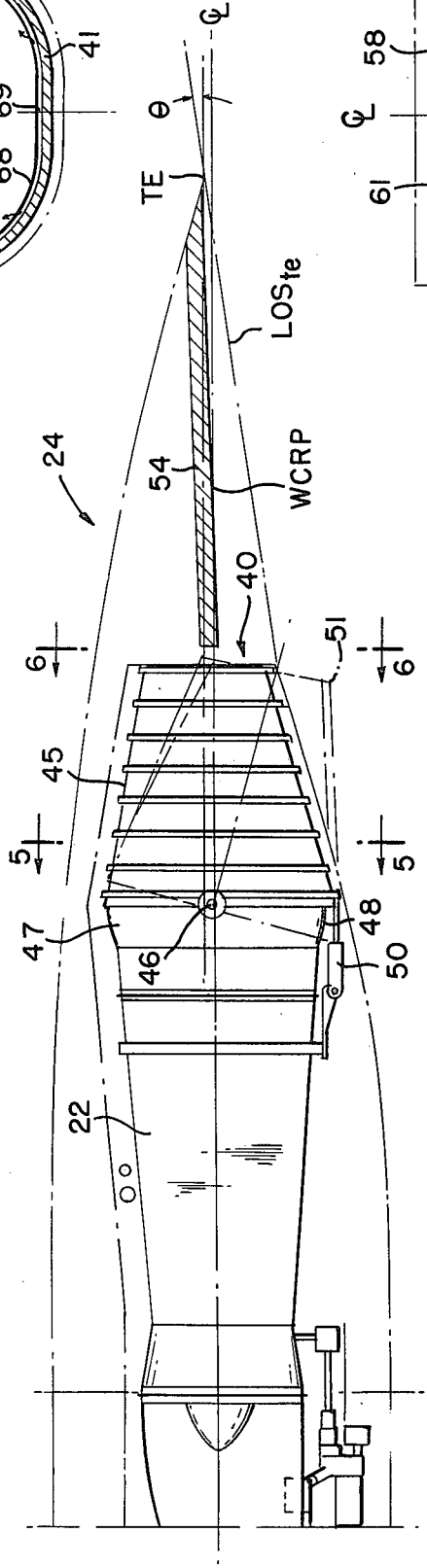
FIG. 4 is a fragmentary, somewhat diagrammatic elevational view of the modified nozzle shown in FIGS. 2 and 3 here mounted under an airfoil (shown in phantom), and depicting particularly the significant improvement in the trailing edge line-of-sight angle with the wing chord reference plane—an included angle $\theta$ ranging between 5° and 10° when the nozzle is in the *cruise* position.

It has been found that a variable area nozzle constructed in accordance with the features of the present invention permits of usage of highly simplified and more effective seals than do the complex sealing arrangements required with conventional static pressure balance chambers of the type employed, for example, in the conventional nozzle illustrated in FIG. 1. The requirement for tension links and relatively heavy pressure back-up plates is eliminated; and, the use of a generally spherical sealing arrangement at the junction of the forward end of the rotatable nozzle 40 and the aft end of the nozzle casing 21 has been found to be considerably more effective and reliable than the generally flat, deflecting-type seals heretofore employed. Moreover, as illustrated in FIG. 4, the invention permits of substantial reduction of the included angle $\theta$ between the trailing edge line-of-sight $LOS_{te}$ and the wing chord reference plane WCRP; with angles $\theta$ ranging between 5° and 10° as contrasted with conventional prior art systems of the type shown in FIG. 1 where the angle $\theta$ commonly ranges from 35° to 40°.

What is claimed is:

1. In a jet propulsion engine of the type adapted to be suspended from an airfoil's wing spar structure and having a jet nozzle defining a minimal included angle $\theta$ between the wing chord reference plane and the trailing edge line-of-sight into the jet nozzle, an improved nonaxisymmetric high aspect ratio afterburner exhaust nozzle assembly comprising, in combination:
   (a) a stationary nozzle casing fixedly mounted on the engine suspended from the airfoil's wing spar structure, said nozzle casing defining: (i) a stationary nozzle duct; and (ii), a rearwardly extending stationary duct member;
   (b) said stationary nozzle duct defining a smooth, circumferentially continuous, frusto-spherical sealing surface;
   (c) said rearwardly extending stationary duct member defining a smooth continuation of the upper portion of said smooth, circumferentially continuous, frusto-spherical sealing surface and forming a rearwardly extending stationary upper wall of said jet nozzle;
   (d) a rotatable nozzle having a lower transverse floor, a pair of spaced upstanding nozzle sidewalls, and a transverse upper cover with the forward extremity of said rotatable nozzle being complementary in shape to, and dimensioned to fit snugly about, said smooth, circumferentially continuous, frusto-spherical sealing surface on said stationary nozzle duct;
   (e) means for mounting said rotatable nozzle on said stationary nozzle duct with said rearwardly extending stationary duct member projecting rearwardly into and extending through said rotatable nozzle, and with said rotatable nozzle being free for rotational movement about a transverse axis passing through the forward end of said rotatable nozzle and said smooth, circumferentially continuous, frusto-spherical sealing surface on said stationary nozzle duct;
   (f) a transversely extending foldable pressure bulkhead hingedly secured along its lower transverse edge to said rearwardly extending duct member adjacent the rear transverse edge thereof and hingedly secured along its upper transverse edge to said transverse upper cover on said rotatable nozzle;
   (g) a first circumferentially continuous, non-deflecting wiping seal mounted on the forward extremity of said rotatable nozzle and in circumferentially continuous wiping sealing engagement with said smooth, circumferentially continuous, frusto-spherical sealing surface on said stationary nozzle duct;
   (h) second non-deflecting wiping seals mounted adjacent the opposed lateral edges of said foldable pressure bulkhead and in wiping sealing engagement with said upstanding nozzle sidewalls;
   (i) third non-deflecting seals mounted on the opposed longitudinal edges of said rearwardly extending stationary duct member in sealing relation with said upstanding nozzle sidewalls; said first, second and third non-deflecting seals being cooperable with the associated ones of said: (i) rotatable nozzle; (ii) stationary nozzle duct; (iii) stationary duct member; (iv) upstanding nozzle sidewalls; and (v), foldable pressure bulkhead so as to form a totally enclosed, sealed, variable volume, static pressure balance chamber in the space bounded by the upper surface of said rearwardly extending stationary duct member, the lower surface of said transverse upper cover, the inner surfaces of said spaced upstanding nozzle sidewalls, and the inner surface of said transversely extending foldable pressure bulkhead; and,
   (j) means for rotating said rotatable nozzle about said transverse axis between: (i) a *cruise* position wherein said foldable pressure bulkhead is in its unfolded state and said bounding surfaces of said static pressure balance chamber define the maximum volume of enclosed space; and (ii), an *afterburn* position wherein said foldable pressure bulkhead is in its folded state and said bounding surfaces of said static pressure balance chamber define the minimum volume of enclosed space.

2. The improved nozzle assembly as set forth in claim 1 wherein said rearwardly extending stationary duct member comprises a cantilever-type rearward extension of the upper portion of said stationary nozzle casing.

3. The improved nozzle assembly as set forth in claim 1 wherein said rotatable nozzle mounting means comprise a trunnion-type mounting means and said transverse axis diametrically bisects said frusto-spherical sealing surface.

4. The improved nozzle assembly as set forth in claim 1 wherein said foldable pressure bulkhead comprises at least two transversely extending panels with the adjacent edges of said panels interconnected by a transversely extending hinge.

5. The improved nozzle assembly as set forth in claims 1, 2, 3 or 4 wherein the hinged connections are defined by hinge seals.

6. The improved nozzle assembly as set forth in claims 1, 2, 3 or 4 wherein said third non-deflecting seals are labyrinth seals.

7. The improved nozzle assembly as set forth in claims 1, 2, 3 or 4 wherein said means for rotating said rotatable nozzle comprise expandable and contractible linear actuating means connected at one end to said rotatable nozzle and at the other end to said stationary nozzle casing.

8. The improved nozzle assembly as set forth in claims 1, 2, 3 or 4 wherein said means for rotating said rotatable nozzle comprise expandable and contractible compression-type linear actuating means connected at one end to said floor on said rotatable nozzle and at the other end to said stationary nozzle casing.

9. The improved nozzle assembly as set forth in claims 1, 2, 3, or 4 wherein said jet nozzle is a nonaxisymmetric high aspect ratio convergent afterburner nozzle.

10. The improved nozzle assembly as set forth in claims 1, 2, 3 or 4 wherein said included angle $\theta$ is in the range of from about 5° to about 10° when said nozzle is in the *cruise* position.

11. The improved nozzle assembly as set forth in claims 1, 2, 3 or 4 wherein said jet nozzle is a nonaxisymmetric high aspect ratio convergent afterburner nozzle and said included angle $\theta$ is in the range of from about 5° to about 10° when said nozzle is in the *cruise* position.

12. In an airfoil mounted jet propulsion engine of the type having a variable area nonaxisymmetric high aspect ratio afterburner exhaust nozzle, the combination comprising:
 (a) an airfoil having a wing spar structure, a trailing edge, and defining a wing chord reference plane passing through said trailing edge;
 (b) a jet propulsion engine including an afterburner casing and an afterburner exhaust nozzle casing fixedly secured to said engine and wherein said engine is secured to, and suspended from, said wing spar structure and tucked tightly beneath said airfoil;
 (c) said afterburner exhaust nozzle casing defining: (i) a stationary nozzle duct, and (ii), a rearwardly extending stationary duct member;
 (d) said stationary nozzle duct defining a smooth, circumferentially continuous, frusto-spherical sealing surface;
 (e) said rearwardly extending stationary duct member defining a smooth continuation of the upper portion of said smooth, circumferentially continuous, frusto-spherical sealing surface and forming a rearwardly extending stationary upper wall of said nonaxisymmetric high aspect ratio afterburner exhaust nozzle;
 (f) a rotatable nozzle having a lower transverse floor, a pair of spaced upstanding nozzle sidewalls, and a transverse upper cover with the forward extremity of said rotatable nozzle being complementary in shape to, and dimensioned to fit snugly about, said smooth, circumferentially continuous, frusto-spherical sealing surface on said stationary nozzle duct;
 (g) means for mounting said rotatable nozzle on said stationary nozzle duct with said rearwardly extending stationary duct member projecting rearwardly into and extending through said rotatable nozzle, and with said rotatable nozzle being free for rotational movement about a transverse axis passing through the forward end of said rotatable nozzle and said smooth, circumferentially continuous, frusto-spherical sealing surface on said stationary nozzle duct;
 (h) a transversely extending foldable pressure bulkhead hingedly secured along its lower transverse edge to said rearwardly extending duct member adjacent the rear transverse edge thereof and hingedly secured along its upper transverse edge to said transverse upper cover on said rotatable nozzle;
 (i) a first circumferentially continuous, non-deflecting wiping seal mounted on the forward extremity of said rotatable nozzle and in circumferentially continuous wiping sealing engagement with said smooth, circumferentially continuous, frusto-spherical sealing surface on said stationary nozzle duct;
 (j) second non-deflecting wiping seals mounted adjacent the opposed lateral edges of said foldable pressure bulkhead and in wiping sealing engagement with said upstanding nozzle sidewalls;
 (k) third non-deflecting seals mounted on the opposed longitudinal edges of said rearwardly extending stationary duct member in sealing relation with said upstanding nozzle sidewalls; said first, second and third non-deflecting seals being cooperable with the associated ones of said: (i) rotatable nozzle; (ii) stationary nozzle duct; (iii) stationary duct member; (iv) upstanding nozzle sidewalls; and (v), foldable pressure bulkhead so as to form a totally enclosed, sealed, variable volume, static pressure balance chamber in the space bounded by the upper surface of said rearwardly extending stationary duct member, the lower surface of said transverse upper cover, the inner surfaces of said spaced upstanding nozzle sidewalls, and the inner surface of said transversely extending foldable pressure bulkhead; and,
 (l) means for rotating said rotatable nozzle about said transverse axis between: (i) a *cruise* position wherein said foldable pressure bulkhead is in its unfolded state and said bounding surfaces of said static pressure balance chamber define the maximum volume of enclosed space; and (ii), an *afterburn* position wherein said foldable pressure bulkhead is in its folded state and said bounding surfaces of said static pressure balance chamber define the minimum volume of enclosed space.

13. The combination as set forth in claim 12 wherein said rearwardly extending stationary duct member comprises a cantilever-type rearward extension of the upper portion of said stationary nozzle casing.

14. The combination as set forth in claim 12 wherein said rotatable nozzle mounting means comprise a trunnion-type mounting means and said transverse axis diametrically bisects said frusto-spherical sealing surface.

15. The combination as set forth in claim 12 wherein said foldable pressure bulkhead comprises at least two transversely extending panels with the adjacent edges of said panels interconnected by a transversely extending hinge.

16. The combination as set forth in claims 12, 13, 14 or 15 wherein the hinge connections are defined by hinge seals.

17. The combination as set forth in claims 12, 13, 14 or 15 wherein said third non-deflecting seals are labyrinth seals.

18. The combination as set forth in claims 12, 13, 14 or 15 wherein said means for rotating said rotatable nozzle comprises expandable and contractible linear actuating means connected at one end to said rotatable nozzle and at the other end to said stationary nozzle casing.

19. The combination as set forth in claims 12, 13, 14 or 15 wherein said means for rotating said rotatable nozzle comprises expandable and contractible compression-type linear actuating means connected at one end to said floor on said rotatable nozzle and at the other end to said stationary nozzle casing.

20. The combination as set forth in claims 12, 13, 14 or 15 wherein said variable area nonaxisymmetric high aspect ratio afterburner exhaust nozzle is a convergent nozzle.

21. The combination as set forth in claims 12, 13, 14, or 15 wherein the included $\theta$ between the wing chord reference plane extending through said airfoil and the trailing edge line-of-sight into said nozzle when said nozzle is in the *cruise* position is in the range of from about 5° to about 10°.

22. The combination as set forth in claims 12, 13, 14 or 15 wherein said variable area nonaxisymmetric afterburner exhaust nozzle is a convergent nozzle and the included angle $\theta$ between the wing chord reference plane extending through said airfoil and the trailing edge line-of-sight into said nozzle when said nozzle is in the *cruise* position is in the range of from about 5° to about 10°.

* * * * *